United States Patent [19]

Wilson

[11] 4,330,082
[45] May 18, 1982

[54] AIR MIXING APPARATUS
[75] Inventor: Wilfred W. Wilson, Toronto, Canada
[73] Assignee: Frank Sloan, Toronto, Canada
[21] Appl. No.: 253,704
[22] Filed: Apr. 13, 1981
[51] Int. Cl.³ ............................................ G05D 23/13
[52] U.S. Cl. ..................................... 236/13; 98/33 A; 98/38 F
[58] Field of Search .............. 236/13; 98/33 A, 38 D, 98/38 F, 38 C 38 R, 38 A, 38 B; 137/625.4, 625.33

[56] References Cited
U.S. PATENT DOCUMENTS

| | | | |
|---|---|---|---|
| 2,313,676 | 3/1943 | Shaver | 98/33 A X |
| 2,896,849 | 7/1959 | Argentieri et al. | 98/38 B X |
| 3,404,618 | 10/1968 | Jacobs | 98/33 R |
| 3,446,272 | 5/1969 | Gaines, Jr. | 98/33 R |
| 3,474,720 | 10/1969 | Qualley et al. | 98/33 R |
| 3,524,399 | 8/1970 | Bohanon | 98/38 X |
| 3,805,831 | 4/1974 | Culbertson | 98/38 X |
| 4,195,774 | 4/1980 | Warner | 236/13 |

Primary Examiner—William E. Tapolcai, Jr.
Attorney, Agent, or Firm—Sim & McBurney

[57] ABSTRACT

Air mixing apparatus that is particularly useful in connection with a winter make-up air and a summer ventilation system for a factory, warehouse or the like includes inner and outer relatively movable ducts, the former having side walls, an air inlet through which outside air can be drawn into the outer duct and an air outlet through which air can exit from the outer duct. At least one first port is provided in the side walls of the outer duct for passage of inside air, i.e, air from inside the building, into the outer duct. The inner duct has at least one second port in its side walls through which air can pass into the inner duct, and the inner duct also has an air outlet for passage of air into the outer duct where it can exit from the air outlet of the outer duct. Baffles extend between the inner and outer ducts on either side of the at least one first port and with the inner and outer ducts define a header. A motor or the like can move the ducts relative to each other between two positions. In one position the first and second ports are completely out of registry, and all air passing through the apparatus is drawn from outside of the building via the air inlet of the outer duct. In the other position the first and second ports are in registry, and all air passing through the apparatus is drawn from inside the building. In intermediate positions the air is drawn in varying amounts from inside and outside of the building.

11 Claims, 3 Drawing Figures

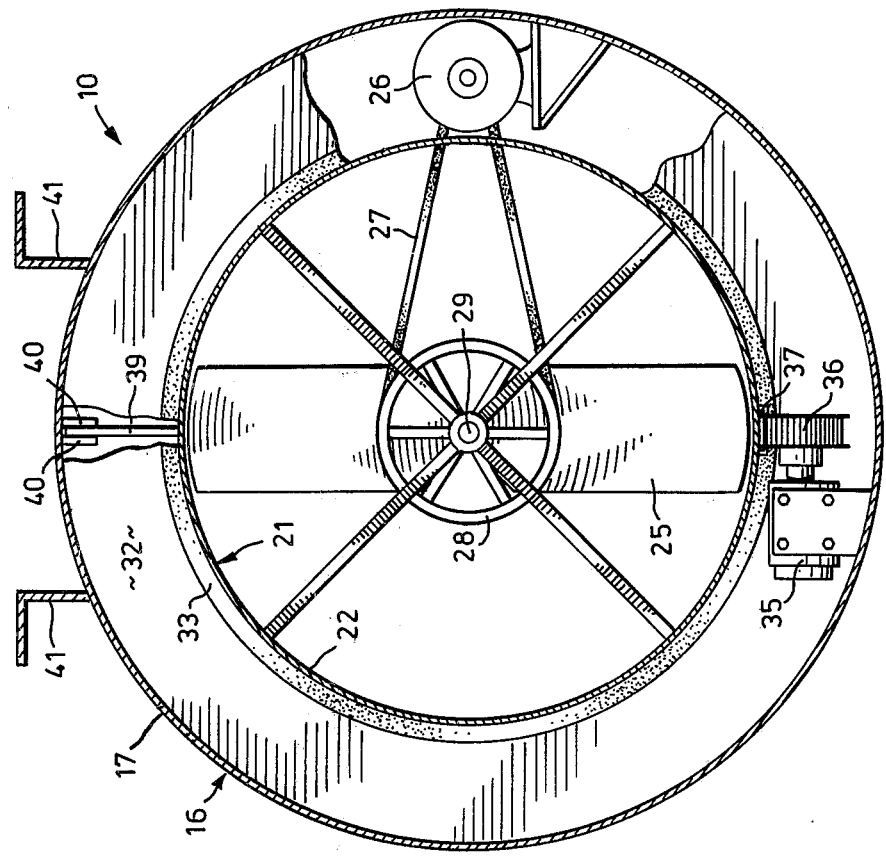
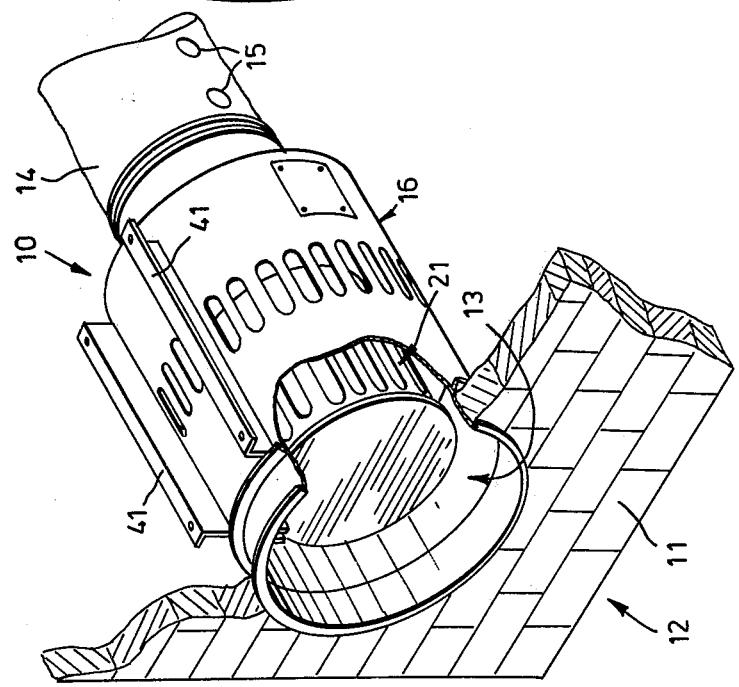

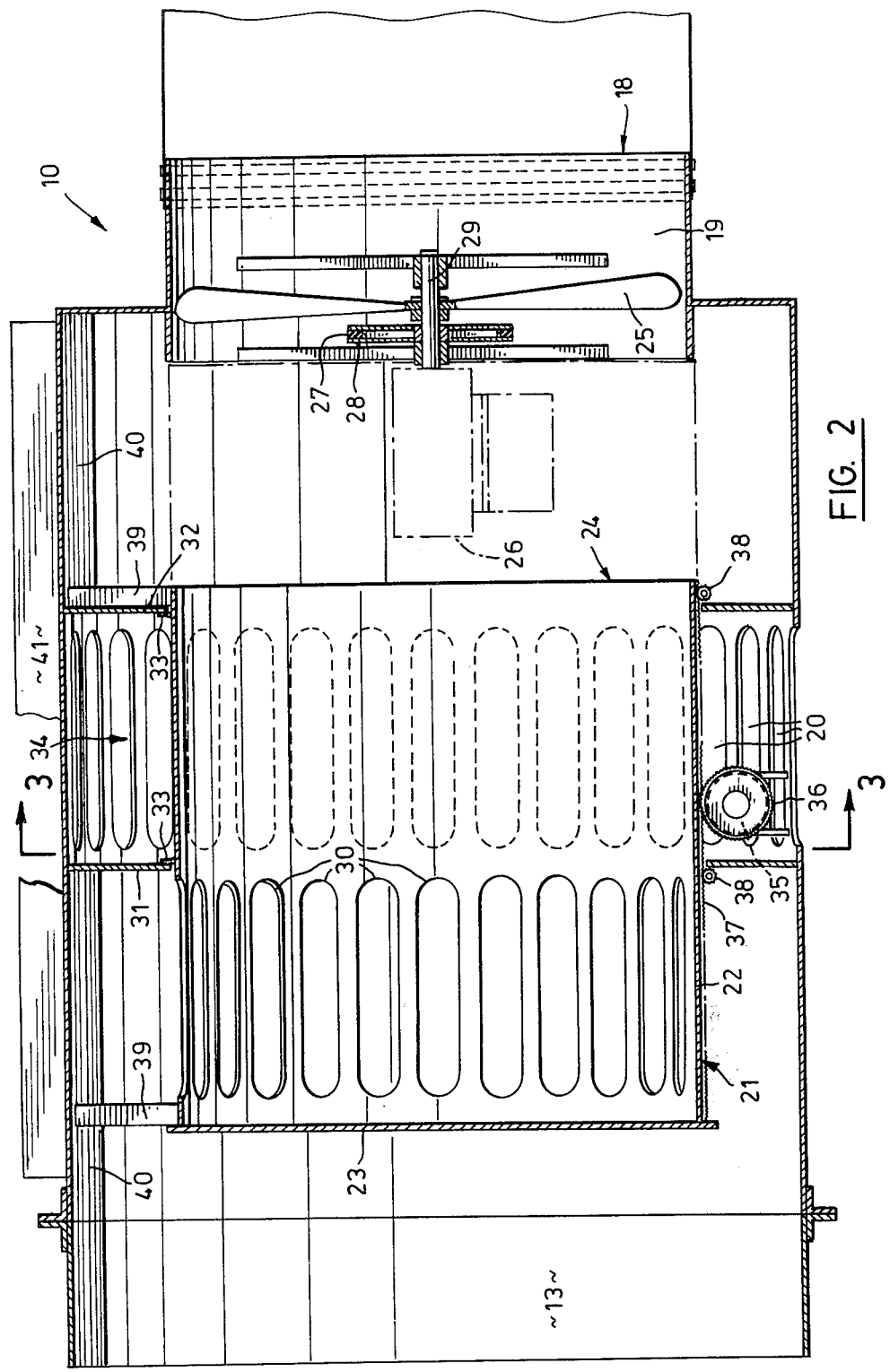

AIR MIXING APPARATUS

BACKGROUND OF THE INVENTION

This invention relates to air mixing apparatus that is particularly useful in connection with a winter make-up air and a summer ventilation system for a factory, warehouse or the like.

Ventilation and air circulating systems for buildings are well known. Reference may be made, for example, to the following U.S. Pat. Nos.: 3,691,928 issued Sept. 19, 1972; 3,404,618 issued Oct. 8, 1968; 3,446,272 issued May 27, 1969; 3,474,720 issued Oct. 28, 1969; 3,747,501 issued July 24, 1973 and 3,524,399 issued Aug. 18, 1970.

Generally speaking, such ventilation and air circulation systems include some form of air mixing apparatus that is capable of drawing air from both inside the building and outside of the building and a duct that is suspended from the roof of the building and which is connected to the air mixing apparatus to receive air therefrom. The duct has a plurality of outlets along its length. Air at an appropriate temperature, which depends upon the ratio of outside and inside air that is drawn into the air mixing apparatus, is forced into the duct and exits from the duct in the area of the roof of the building. The result is that smoke and fumes are diluted, stratification of heat and foul air is eliminated, and air quality and temperature are homogenized from floor to ceiling. The system is energy efficient, since waste heat adjacent the roof area is forced down to the floor area. Another advantage of the system is that the drawing in of fresh make-up air eliminates negative pressure and stops the infiltration of cold outside air and therefore drafts and cold spots.

A typical type of air mixing apparatus which has been used in the past is shown in aforementioned U.S. Pat. No. 3,691,928. It is subject to a number of disadvantages. More specifically, the system shown therein is difficult to balance, is subject to mechanical failure, and the dampers and operating linkage therefor can freeze up during the winter.

Two different types of air mixing apparatus are shown in U.S. Pat. No. 2,313,676 issued Mar. 9, 1943 and U.S. Pat. No. 2,896,849 issued Jul. 28, 1959. The disadvantage of the apparatus shown in U.S. Pat. No. 2,896,849 is that it is relatively complex and requires separate cold air and warm air ducts. The apparatus shown in U.S. Pat. No. 2,313,676 also is relatively complex and requires two separate mechanisms for controlling the ratio of outside air to recirculating inside air.

The prior art noted hereinbefore is the most relevant prior art known to the inventor and assignee of the instant application.

SUMMARY OF THE INVENTION

In accordance with the instant invention there is provided air mixing apparatus that is mechanically simple, is constructed of a small number of parts and which avoids the disadvantages of the prior art air mixing apparatus referred to hereinbefore.

In accordance with one aspect of this invention there is provided air mixing apparatus comprising an outer duct having side walls, an air inlet through which air can be drawn into said duct, an air outlet through which air can exit from said duct and at least one first port in said side walls for passage of air into said duct; an inner duct movably mounted within said outer duct, said inner duct having side walls, said inner duct having at least one second port in said side walls of said inner duct through which air can pass into said inner duct, said inner duct also having an air outlet through which air can exit from said inner duct, said air outlets of said inner and outer ducts being in air-flow relationship, whereby air exiting from said air outlet of said inner duct then exits from said air outlet of said outer duct; air baffle means extending between said outer and inner ducts on either side of said at least one first port and with said inner and outer ducts defining a header into which air can pass through said at least one first port; means for relatively moving said inner and outer ducts back and forth between a first position and a second position, in said first position said at least one second port communicating in air-flow relationship with said air inlet of said outer duct, whereby air passes from said air inlet of said outer duct through said at least one second port into said inner duct, and said side walls of said inner duct blocking flow of air from said header into said inner duct, in said second position said at least one second port communicating in air-flow relationship with said header, whereby air passes from said header through said at least one second port into said inner duct, air flow from said air inlet of said outer duct into said inner duct being blocked by said inner duct and said baffle means, in intermediate positions of said outer and inner ducts between said first and second positions said at least one second port having varying areas exposed to said header and to said air inlet of said outer duct, whereby varying amounts of air can be admitted to said inner duct via said at least one second port from said air inlet of said outer duct and from said header.

BRIEF DESCRIPTION OF THE DRAWINGS

This invention will become more apparent from the following detailed description, taken in conjunction with the appended drawings in which:

FIG. 1 is a perspective view, partly broken away, showing an air ventilation and circulation system employing air mixing apparatus embodying the instant invention;

FIG. 2 is a longitudinal section through air mixing aparatus embodying the instant invention; and FIG. 3 is a transverse section through the air mixing apparatus.

Referring first to FIG. 1, air mixing apparatus 10 embodying the instant invention is shown as supported from the wall 11 of a building 12. Air mixing apparatus 10 has an air inlet 13 for outside air and is connected to a duct 14, which may be of polyethylene or the like, and which is supported from the roof of building 12 in a region adjacent to the roof. Duct 14 extends across the length of the building and, depending upon the width of the building, more than one air ventilation and circulation system of the type shown may be provided. There are a plurality of outlets 15 in duct 14 through which air from duct 14 exits into the interior of the building adjacent the roof thereof.

Referring now to FIGS. 2 and 3, air mixing apparatus 10 includes an outer duct 16 having side walls 17, an air inlet 13 through which air can be drawn into the outer duct and an air outlet 18 through which air can exit from the outer duct. It will be noted that air outlet 18 is defined by a necked down section 19 of outer duct 16. This neck or flange 19 as well as outer duct 16 preferably are cylindrical in configuration to minimize the noise caused by air flowing through the duct.

Provided in the side walls 17 of outer duct 16 are a number of ports 20 which, in the embodiment shown, are of elongated configuration. However, the shape and number of ports 20 may vary widely as long as an opening or openings of sufficient size are provided for the required air flow. It should be noted that ports 20 communicate with the air inside of building 12.

Coaxially mounted within outer duct 17 is an inner duct 21 which, preferably, also is cylindrical in configuration. Inner duct 21 is movably mounted within outer duct 17, as will become more apparent hereinafter. Inner duct 21 has side walls 22 and an end wall 23. The opposite end of inner duct 21 is open, however, defining an air outlet 24 through which air can exit from inner duct 21. Air outlets 18 and 24 are in air-flow relationship, so air exiting from the air outlet of the inner duct then exits from the air outlet of the outer duct and, in this connection, there may be provided within outer duct 17 a fan 25 driven by a motor 26 via a belt 27 and pulley 28, the latter being keyed or otherwise fixed to the shaft 29 on which fan blades 25 are mounted. For the sake of simplicity, the bearings for the fan have not been shown.

Inner duct 21 has a number of ports 30 in its side walls 22. Ports 30 are of the same configuration as ports 20 and extend in spaced apart relationship with respect to each other around the periphery of inner duct 21, just as ports 20 extend in spaced apart relationship with respect to each other around the periphery of outer duct 17. It will be noted that ports 30 are located closer to the closed end of inner duct 21 than to the open end thereof. Again the form and configuration and the number of ports 30 may be varied as long as an appropriate area is provided for the required flow of air therethrough.

Two annular air baffles 31 and 32 with appropriate seals 33 extend between outer and inner ducts 17 and 21 respectively on either side of ports 20 and, with the inner and outer ducts, define a header 34 into which air can pass through ports 20.

The inner and outer ducts are capable of relative longitudinal movement with respect to each other. In the embodiment as shown this is accomplished by means of a motor 35 that drives a pinion 36 which engages a rack 37 that is secured to inner duct 21. Inner duct 21 also is supported by toothed idler rollers 38 that run in rack 37. Further support is provided by an upper rail 39 secured to inner duct 21 diametrically opposite from rack 37 and which runs in a track defined by two brackets 40 that are secured to outer duct 17.

As best shown in FIG. 3, hanger brackets 41 are secured to outer duct 17 to facilitate mounting thereof.

Inner duct 21 is movable between two positions, one of which is shown in FIG. 2. In that position ports 30 communicate in air-flow relationship with air inlet 13 of outer duct 17, permitting outside air to pass from air inlet 13 of outer duct 17 through ports 30 into inner duct 21. In this position of inner duct 21 the side walls thereof effectively block the flow of air from header 34 into inner duct 21, so that in this position of the inner duct, all of the air flowing through air mixing aparatus 10 is drawn from outside of the building. In the second position of the inner duct, it is moved fully to the right in FIG. 2. In this position ports 30 communicate in air-flow relationship with header 34, so air passes from header 34 through ports 30 into inner duct 21, and air flow from air inlet 13 of outer duct 17 is blocked by end wall 23 of inner duct 21 and baffle 31.

Inner duct 21 can assume intermediate positions between the two extreme positions hereinabove noted. In these intermediate positions ports 30 will communicate in part with header 34 and in part with air inlet 13, whereby the ratio of outside to inside air may be varied. The degree of variation normally is controlled by a thermostat located in duct 14. The thermostat senses the temperature of the air in the duct and controls motor 35 to provide a proper ratio of outside air to inside air to maintain a certain predetermined temperature of air in duct 14.

It will be noted that the primary components of the air mixing apparatus of the instant invention are cylindrical in configuration, at least in the preferred embodiment. This is desirable from the point of view of minimizing the noise of air flowing through the apparatus.

While a preferred embodiment of the instant invention has been disclosed herein, those skilled in the art will appreciate that changes and modifications may be made therein without departing from the spirit and scope of this invention as defined in the appended claims.

I claim:

1. Air mixing apparatus comprising an outer duct having side walls, an air inlet through which air can be drawn into said duct, an air outlet through which air can exit from said duct and at least one first port in said side walls for passage of air into said duct; an inner duct movably mounted within said outer duct, said inner duct having side walls, said inner duct having at least one second port in said side walls of said inner duct through which air can pass into said inner duct, said inner duct also having an air outlet through which air can exit from said inner duct, said air outlets of said inner and outer ducts being in air-flow relationship, whereby air exiting from said air outlet of said inner duct then exits from said air outlet of said outer duct; air baffle means extending between said outer and inner ducts on either side of said at least one first port and with said inner and outer ducts defining a header into which air can pass through said at least one first port; means for relatively moving said inner and outer ducts back and forth between a first position and a second position, in said first position said at least one second port communicating in air-flow relationship with said air inlet of said outer duct, whereby air passes from said air inlet of said outer duct through said at least one second port into said inner duct, and said side walls of said inner duct blocking flow of air from said header into said inner duct, in said second position said at least one second port communicating in air-flow relationship with said header, whereby air passes from said header through said at least one second port into said inner duct, air flow from said air inlet of said outer duct into said inner duct being blocked by said inner duct and said baffle means, in intermediate positions of said outer and inner ducts between said first and second positions said at least one second port having varying areas exposed to said header and to said air inlet of said outer duct, whereby varying amounts of air can be admitted to said inner duct via said at least one second port from said air inlet of said outer duct and from said header.

2. Air mixing apparatus according to claim 1 including a fan located in said air outlet of said outer duct.

3. Air mixing apparatus according to claim 1 including means responsive to the temperature of air exiting from said air outlet of said outer duct for controlling the relative positions of said outer and inner ducts.

4. Air mixing apparatus according to claim 1 wherein said means for relatively moving said outer and inner ducts comprises a motor driving a pinion and a rack on one of said ducts, said pinion engaging and driving said rack.

5. Air mixing apparatus according to claim 4 including means responsive to the temperature of air exiting from said air outlet of said outer duct for controlling the operation of said motor.

6. Air mixing apparatus according to claim 1 wherein the end of said inner duct that is adjacent to said air inlet of said outer duct is closed.

7. Air mixing apparatus according to claim 6 wherein the end of said inner duct that is adjacent to said air outlet of said outer duct is open and is said air outlet of said inner duct.

8. Air mixing apparatus according to claim 7 wherein said inner and outer ducts are cylindrical.

9. Air mixing apparatus according to claim 1 wherein said inner and outer ducts are cylindrical.

10. In combination with a building, air circulating apparatus comprising air mixing apparatus as claimed in claim 1, said air inlet of said outer duct being connected and positioned to draw outside air into said air inlet of said outer duct, said at least one port being connected and positioned to draw air from within said building into said header, and duct means connected to said air outlet of said outer duct and extending into said building, said duct means having openings therein through which air can exit from said duct means into said building.

11. The combination according to claim 10 wherein said duct means is adjacent the roof of said building.

* * * * *